(12) United States Patent
Seo

(10) Patent No.: US 11,660,707 B2
(45) Date of Patent: May 30, 2023

(54) WELDING QUALITY INSPECTION APPARATUS AND METHOD OF THE SAME

(71) Applicants: HYUNDAI MOTOR COMPANY, Seoul (KR); KIA MOTORS CORPORATION, Seoul (KR)

(72) Inventor: Bok Deok Seo, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 618 days.

(21) Appl. No.: 16/819,993

(22) Filed: Mar. 16, 2020

(65) Prior Publication Data

US 2020/0376605 A1    Dec. 3, 2020

(30) Foreign Application Priority Data

May 28, 2019   (KR) .................. 10-2019-0062410

(51) Int. Cl.
```
B23K 31/12      (2006.01)
B23K 11/36      (2006.01)
B23K 11/25      (2006.01)
B23K 11/11      (2006.01)
```
(52) U.S. Cl.
CPC .......... *B23K 31/125* (2013.01); *B23K 11/115* (2013.01); *B23K 11/253* (2013.01); *B23K 11/36* (2013.01)

(58) Field of Classification Search
CPC ..... B23K 11/115; B23K 11/253; B23K 11/36; B23K 31/125

USPC ..................................................... 219/130.01
See application file for complete search history.

(56) References Cited

U.S. PATENT DOCUMENTS

| | | | | |
|---|---|---|---|---|
| 6,232,572 B1* | 5/2001 | Kanjo | ................. | B23K 31/125 219/110 |
| 2015/0283644 A1* | 10/2015 | Kawai | .................... | B25J 9/1697 219/83 |

* cited by examiner

*Primary Examiner* — Dana Ross
*Assistant Examiner* — James F Sims, III
(74) *Attorney, Agent, or Firm* — McDonnell Boehnen Hulbert & Berghoff LLP

(57) ABSTRACT

A welding quality inspection apparatus for inspecting the welding quality of a plurality of welding parts formed on the material through the upper electrode and the lower electrode of the welding gun includes a position detection unit for detecting a position of the upper electrode, a control unit generating a position table based on a signal detected by the position detection unit during a total welding time of welding the plurality of welding parts of the material, generating first position data for a first welding time and second position data for a second welding time of a spot welding time of each of the welding parts based on the position table, checking whether the welding parts are defective by using the first position data, the second position data, and reference data, and generating result data based on whether the welding parts are detective, and an output unit for outputting the result data.

8 Claims, 8 Drawing Sheets

WELDING QUALITY INSPECTION APPARATUS AND METHOD OF THE SAME

CROSS REFERENCE TO RELATED APPLICATIONS

This application claims priority to and the benefit of Korean Patent Application No. 10-2019-0062410 filed in the Korean Intellectual Property Office on May 28, 2019, the entire contents of which are incorporated herein by reference.

BACKGROUND

(a) Field

The present disclosure relates to a welding quality inspection apparatus, more particularly, to a welding quality inspection apparatus and a method of the same for inspecting welding quality of welding part formed on the material based on the position of welding gun.

(b) Description of the Related Art

Welding is a way of permanently joining two metals together. Such welding is a part of two metal materials which are melted and joined to each other, which is one of the machining methods that are very widely used throughout the industry.

In particular, materials of the vehicles are often bonded to each other, so a welding method, which is a permanent bonding method, is applied.

In the automotive field, if a welding defect exists, and the vehicle has lower stiffness than the design stiffness, it may pose a threat to the driver's safety. Therefore, the quality inspection of the weld state after welding is one of the most important quality control items.

In order to inspect the welding quality of the vehicle body, destructive inspection including the electric wave destruction method and the anti-destructive method is currently performed.

The destructive inspection is an inspection to destroy the selected sample to check the welding condition of the product produced in the line. In the destructive inspection, a separation experiment is performed in which the welded state is estimated by the force required for the separation while separating the two joined metal materials by applying a physical force.

This destructive inspection has a high risk in the experimental process, and also takes a long time. In addition, in the case of the destructive inspection, since the selected sample is destroyed during the inspection process, an economic loss occurs as the product selected as the inspection object is discarded after the inspection and the inspection is performed.

Recently, a non-destructive welding quality inspection apparatus has been disclosed that can determine the welding quality of an inspection object welded with two metal materials by using a laser.

Such a non-destructive method is largely exemplified by a vision device method, a contact displacement sensor method, and an ultrasonic sensor method.

The vision device method is a method of irradiating a laser to a welding part of a welding inspection object, detecting the light with a CCD camera, and determining whether or not it is on the welded surface, the contact displacement sensor method is a method of determining the quality of the welded surface of the welding inspection object by the contact displacement sensor, and the ultrasonic sensor method is a method of oscillating an ultrasonic wave to a welding part of a welding inspection object using an ultrasonic sensor, and determining whether or not to weld the inside of the welding part with sound waves reflected from the welding part.

However, the conventional non-destructive method requires a device such as a separate laser, an ultrasonic sensor, etc., so that a large investment cost is generated, and spatter and welding defects are not easy to detect.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a welding quality inspection apparatus and a method of the same for inspecting welding quality of welding part formed on the material by spot welding based on the position of welding gun.

Further, an exemplary embodiment of the present disclosure provides a welding quality inspection apparatus and method capable of a total quality inspection of a plurality of welding parts formed on the material.

According to an exemplary embodiment of the present disclosure, a welding quality inspection apparatus for inspecting the welding quality of a plurality of welding parts formed on the material through the upper electrode and the lower electrode of the welding gun includes a position detection unit for detecting a position of the upper electrode, a control unit generating a position table based on a signal detected by the position detection unit during a total welding time of welding the plurality of welding parts of the material, generating first position data for a first welding time and second position data for a second welding time of a spot welding time of each of the welding parts based on the position table, checking whether the welding parts are defective by using the first position data, the second position data, and reference data, and generating result data based on whether the welding parts are detective, and an output unit for outputting the result data.

Further, the control unit may extract a plurality of electrode position values from a first energization time to a second energization time in the spot welding time from the position table, and generate the first position data using the plurality of electrode position values.

Further, the control unit may generate the first position data by calculating an average value of the plurality of electrode position values.

Further, the control unit may extract a plurality of electrode position values from a third energization time to a fourth energization time in the spot welding time from the position table, and generate the second position data using the plurality of electrode position values.

Further, the control unit may generate the second position data by calculating an average value of the plurality of electrode position values.

Further, the control unit may compare the first position data with the second position data to generate position change data, and if the position change data is within the reference data range, determines that it is normal to generate result data.

Further, the control unit may set the reference data based on at least one of the number, type, and thickness of the material for each of the plurality of welding parts.

Further, the output unit may include at least one of a speaker to output the result data through sound, a display unit for displaying the result, and a lamp unit for outputting the result data through light.

Further, according to another exemplary embodiment of the present disclosure, a welding quality inspection method for inspecting the welding quality of a plurality of welding parts formed on the material through the upper electrode and the lower electrode of the welding gun includes detecting a position of the upper electrode during a total welding time of welding the plurality of welding parts of the material, generating a position table based on the position of the upper electrode, generating first position data for a first welding time of a spot welding time of each of the welding parts based on the position table, generating second position data for a second welding time of a spot welding time of each of the welding parts based on the position table, and generating result data by checking whether the welding parts are defective based on the first position data, the second position data, and reference data.

The exemplary embodiment of the present disclosure can save on inspection cost because it is possible to inspect the welding quality of the welding part formed on the material by spot welding based on the position of the upper electrode of the welding gun without adding a separate device.

Further, since a plurality of welding parts formed on the material can be inspected for quality, welding defects can be prevented, welding quality can be improved, and personnel required for welding inspection can be reduced, thereby reducing labor costs.

Further, an effect that can be obtained or that is predicted with an exemplary embodiment of the present disclosure is directly or suggestively described in a detailed description of an exemplary embodiment of the present disclosure. That is, various effects that are predicted according to an exemplary embodiment of the present disclosure will be described within a detailed description to be described later.

DETAILED DESCRIPTION

Hereinafter, an operation principle of an apparatus and method for a welding quality inspection apparatus and a method of the same according to an exemplary embodiment of the present disclosure will be described in detail with reference to the accompanying drawings. However, the attached drawings and a detailed description to be given later relate to an exemplary embodiment of several exemplary embodiments for effectively describing a characteristic of the present disclosure. Therefore, the present disclosure is not limited to only the following drawings and description.

Further, detailed descriptions of well-known functions and structures incorporated herein may be omitted to avoid obscuring the subject matter of the present disclosure. The terms used herein are defined according to the functions of the present disclosure, and may vary depending on a user's or an operator's intension and usage. Therefore, the terms used herein should be understood based on the descriptions made herein.

Further, in order to effectively describe technical characteristics of the present disclosure, the following exemplary embodiment may appropriately change, integrate, or separate terms to be clearly understood by a person of ordinary skill in the art, and the present disclosure is not limited thereto.

Hereinafter, an exemplary embodiment of the present disclosure will be described in detail with reference to the accompanying drawings.

Figure 1:
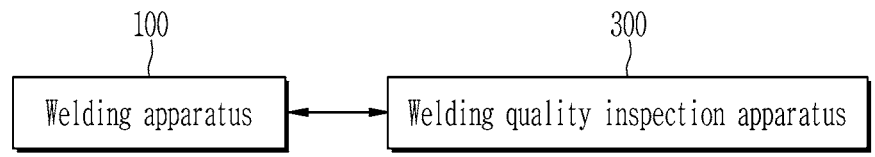
FIG. 1 is a block diagram briefly showing a welding system including a welding apparatus and a welding quality inspection apparatus according to an exemplary embodiment of the present disclosure.
Figure 2:
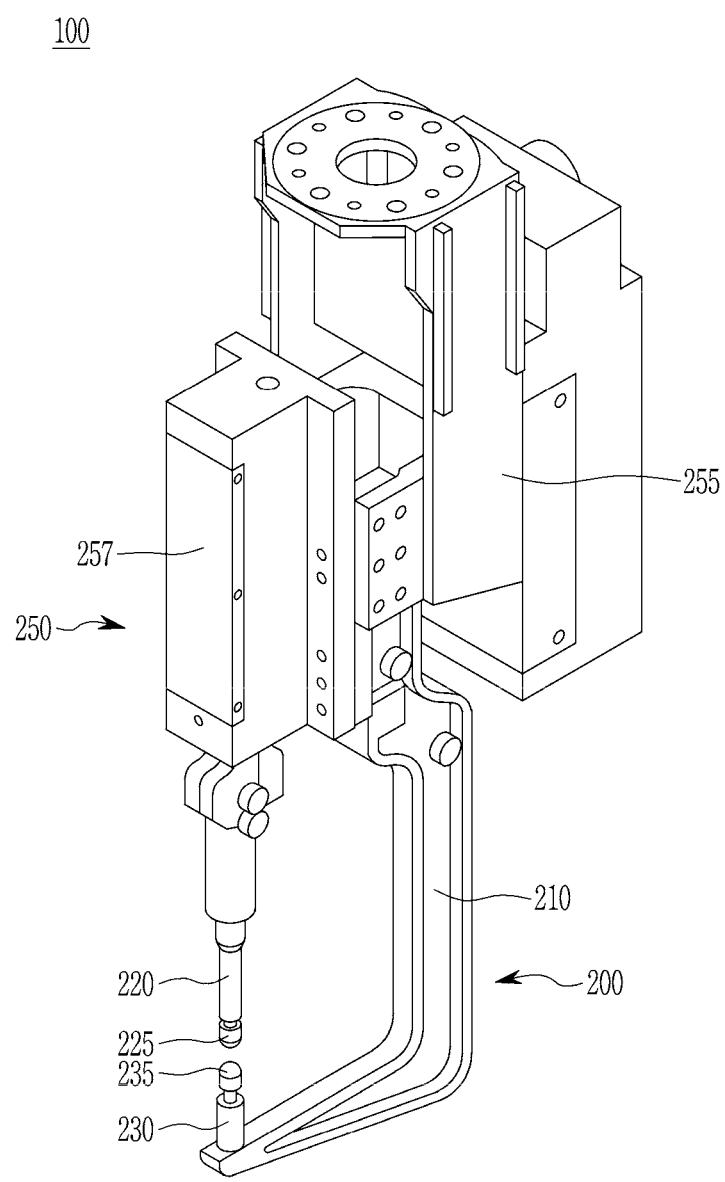
FIG. 2 is a perspective view showing a welding apparatus according to an exemplary embodiment of the present disclosure.

FIG. 1 is a block diagram briefly showing a welding system including a welding apparatus and a welding quality inspection apparatus according to an exemplary embodiment of the present disclosure, and FIG. 2 is a perspective view showing a welding apparatus according to an exemplary embodiment of the present disclosure.

Referring to FIG. 1, a welding system includes a welding apparatus 100 and a welding quality inspection apparatus 300.

The welding apparatus 100 may be applied to a vehicle body assembly process of assembling vehicle body assembly components such as a vehicle body panel. That is, the welding apparatus 100 performs the assembly in such a manner that the welding apparatus 100 welds the body assembly material by electric resistance while applying a pressing force to the body assembly material. For this, the welding apparatus 100 includes a welding gun 200 and a pressurizing unit 250 as shown in FIG. 2.

The welding gun 200 is for integrally overlapping the superposed materials in the vehicle body assembly process in order to reduce weight of the vehicle body panel.

For this, the welding gun 200 includes a gun frame 210 in which the upper electrode 220 and the lower electrode 230 are formed.

The gun frame 210 is installed at an arm tip of a welding robot (not shown), and has a C-shape. The gun frame 210 may include various accessory elements such as brackets, bars, rods, plates, housings, cases, blocks, rails, etc. for supporting the components.

These various accessory elements are for installing the components to be described later in the gun frame 210, and various embodiments of the present disclosure will be referred to collectively as the gun frame 210, except in exceptional cases.

The upper electrode 220 is installed at one end of the gun frame 210. The upper electrode 220 is installed on one side of an upper portion of the gun frame 210, and is connected to the pressurizing unit 250 to provide a pressing force.

The upper electrode 220 is installed on the upper side of the gun frame 210 and is movable up and down. That is, the upper electrode 220 move up and down in the gun frame 210 toward the lower electrode 230 through the pressurizing unit 250. The upper electrode 220 may be referred to as a movable electrode.

An upper welding tip 225 is installed at the tip of the upper electrode 220. The upper welding tip 225 generates resistance heat together with the lower electrode 230 in the welding part of the material.

The lower electrode 230 is installed at the other end of the gun frame 210. That is, the lower electrode 230 is fixed to the lower side of the gun frame 210 corresponding to the upper electrode 220.

The lower electrode 230 supports the vehicle assembly material.

A lower welding tip 235 is installed at the tip of the lower electrode 230. The lower welding tip 235 is installed at the tip of the lower electrode 230. Thus, the lower electrode 230 may be referred to as a fixed electrode.

The lower welding tip 235 may generate resistance heat by applying a current to the welding part of the material together with the upper welding tip 225 of the upper electrode 220.

The pressurizing unit 250 includes a drive motor 255 for driving the upper electrode 220. The pressurizing unit 250 is installed on the upper portion of the welding gun 200 to provide a pressing force to the upper electrode 220.

The pressurizing unit 250 includes an operation rod 257 for converting the rotational motion of the drive motor 255 into a straight line to guide the upper electrode 220 to move back and forth in the vertical direction.

The drive motor 255 may be made of a servo motor capable of adjusting the rotation speed and the rotation direction.

Meanwhile, the driving of the upper electrode 220 through the drive motor 255 is described as an example, but is not limited thereto. Any drive source capable of moving the upper electrode 220 in the vertical direction may be used. For example, the drive source may consist of a cylinder that linearly moves by pneumatic pressure.

Since the main configuration of the welding apparatus 100 as described above is made of a welding apparatus 100 of a known technique well known in the art, a more detailed description of the configuration will be omitted herein.

The welding quality inspection apparatus 300 controls the welding apparatus 100 to assemble the vehicle body assembly parts such as the vehicle body panel. Meanwhile, the welding quality inspection apparatus 300 controls the welding apparatus 100, for example. However, the present disclosure is not limited thereto.

The welding quality inspection apparatus 300 inspects the quality of the plurality of welding parts formed on the overlapping materials. That is, the welding quality inspection apparatus 300 detects the position of the upper electrode during the total welding time for welding the plurality of welding parts of the material. The welding quality inspection apparatus 300 generates a position table based on the detected signal. At this time, the welding quality inspection apparatus 300 may generate a position table by matching the position of the upper electrode for each welding time.

The welding quality inspection apparatus 300 generates first position data and second position data based on the position table. The welding quality inspection apparatus 300 checks whether the welding part is defective by using the first position data, the second position data, and reference data, and generates result data based on whether the welding part is defective.

The welding quality inspection apparatus 300 will be described in detail with reference to FIG. 3.

The welding quality inspection apparatus 300 may be implemented as one or more microprocessors operated by a set program, and the set program includes a series of instructions for each step included in the inspection method according to an exemplary embodiment of the present disclosure described below.

Figure 3:
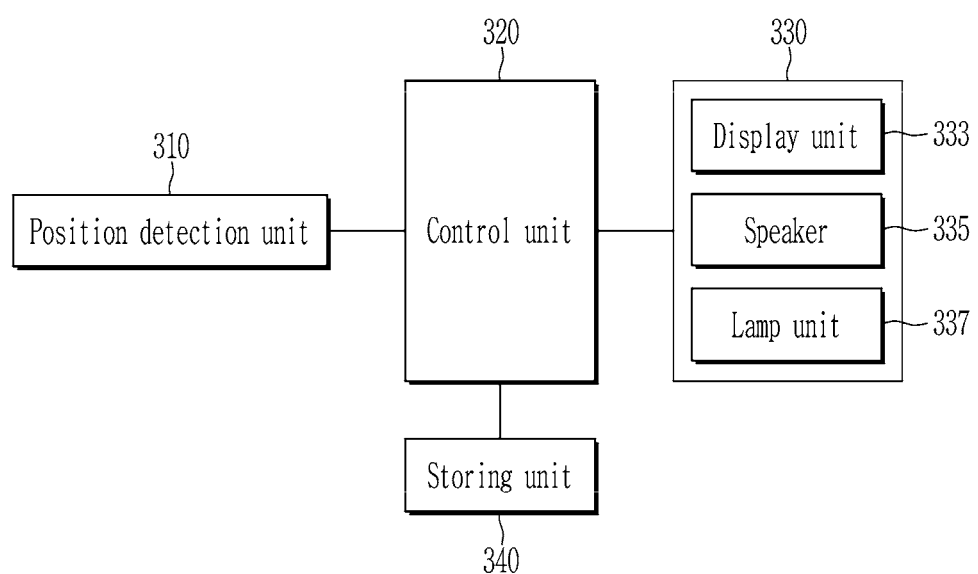
FIG. 3 is a block diagram showing a welding quality inspection apparatus according to an exemplary embodiment of the present disclosure.

FIG. 3 is a block diagram showing a welding quality inspection apparatus according to an exemplary embodiment of the present disclosure.

Referring to FIG. 3, the welding quality inspection apparatus 300 includes a position detection unit 310, a control unit 320, an output unit 330, and a storing unit 340.

The position detection unit 310 detects the position of the welding gun 200. That is, the position detection unit 310 detects the position of the upper electrode 220 during the total welding time during which the welding gun 200 welds to the welding part of the material. In this case, the total welding time may represent a time for welding the plurality of welding parts through the welding apparatus 100. The total welding time represents the welding start time to the welding completion time, and the welding start time represents the time when the control unit 320 starts to control the welding robot. The welding completion time may represent a time when the control unit 320 completes the control of the welding robot.

The position detection unit 310 provides the detected signal to the control unit 320.

If the position detection unit 310 can detect the position of the upper electrode 220, the type is irrelevant. For example, the position detection unit 310 may be an encoder installed in the robot. That is, when the position detection unit 310 is an encoder, the rotation direction and the rotation amount may be detected by the drive motor 255 and provided to the control unit 320.

The control unit 320 controls the welding apparatus 100 to weld the vehicle material. That is, the control unit 320 controls the behavior of the robot according to the welding processor which is set for the material for each vehicle type, parts, to move the welding gun 200 to the welding line on the blueprint. The control unit 320 controls the welding by applying an electric current for a predetermined time set in a state in which both sides of the joint surface of the material are pressed through the welding gun 200 to generate electrical resistance.

The control unit 320 controls the position detection unit 310, the output unit 330, and the storing unit 340 of the welding quality inspection apparatus 300.

In other words, the control unit 320 is provided with a signal detected by the position detection unit 310 and generates the position table based on the detected signal. The control unit 320 generates first position data for the first welding time of the spot welding time of each of the welding parts based on the position table. The spot welding time may represent a time for welding each of the plurality of welding parts.

The control unit 320 generates second position data for the second welding time of the spot welding time of each of the welding parts based on the position table.

The control unit 320 generates result data by checking whether each of the welding parts is defective based on the first position data, the second position data, and the reference data.

The control unit 320 may control the output unit 330 to output the result data to inform the operator of the result on the welding quality.

The output unit 330 outputs the result data generated by the control unit 320. For this, the output unit 330 includes a display unit 333, a speaker 335, and a lamp unit 337.

The display unit 333 displays data generated during the operation of the position detection unit 310 and the control unit 320 of the welding quality inspection apparatus 300.

That is, the display unit 333 may display the signal detected by the position detection unit 310. The display unit 333 may display the position table, the first position data, the second position data, and the reference data generated by the control unit 320.

The display unit 333 may display the result data generated by the control unit 320 through letters, numbers, and pictures.

The speaker 335 outputs the result data through sound under the control of the control unit 320.

The lamp unit 337 outputs the result data through light under the control of the control unit 320. The lamp unit 337 may output the result data through the color of light.

For example, the lamp unit 337 may output green light when the result included in the result data is normal under the control of the control unit 320, and output red when the result included in the result data is defective. The light according to the result data may be set by a predetermined rule, set by an operator, or set by the control unit 320.

The storing unit 340 stores data required by the components of the welding quality inspection apparatus 300 and data generated by the components of the welding quality inspection apparatus 300. For example, the storing unit 340 may store the position table, the first position data, the second position data, and the reference data generated by the control unit 320. The storing unit 340 may store the result data generated by the control unit 320.

The storing unit 340 may store various programs for controlling the overall operation of the welding quality inspection apparatus 300. The storing unit 340 may provide necessary data according to a request of a component of the welding quality inspection apparatus 300.

The storing unit 340 may be formed of an integrated memory, or may be divided into a plurality of memories.

Hereinafter, the welding quality inspection method will be described with reference to FIGS. 4 to 11.

Figure 4:
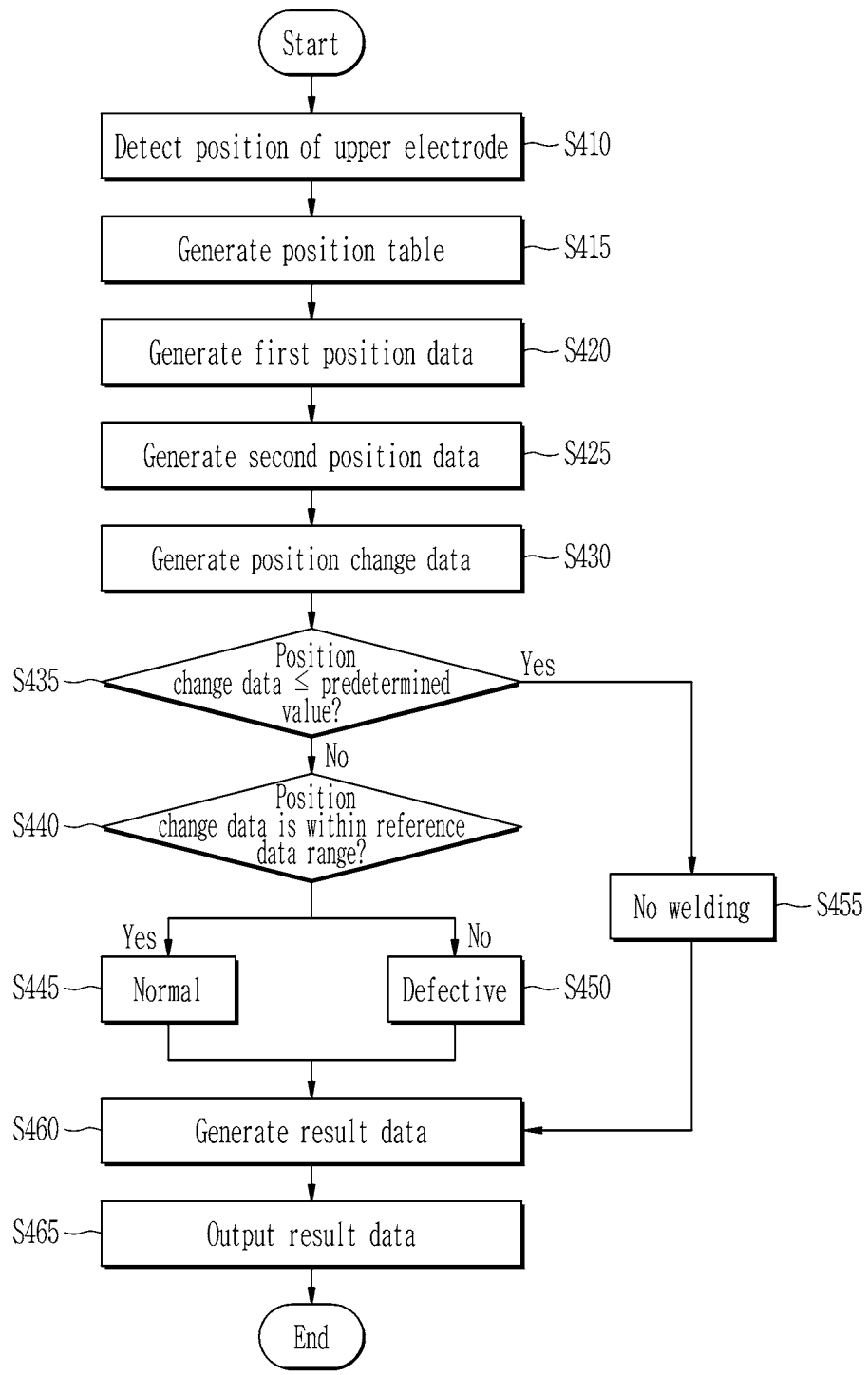
FIG. 4 is a flowchart showing a welding quality inspection method according to an exemplary embodiment of the present disclosure.
Figure 5:
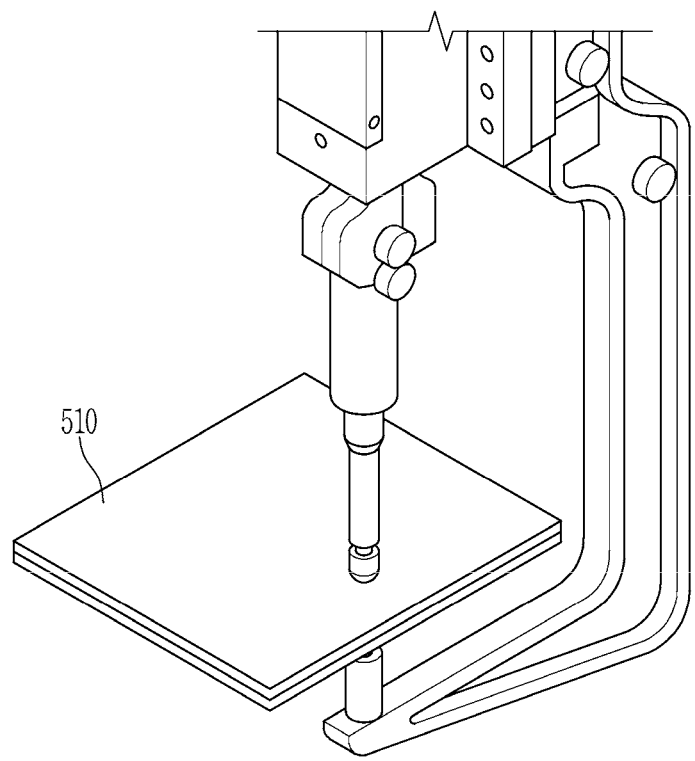
FIG. 5 is an exemplary view showing a welding gun for explaining welding in the welding quality inspection method according to an exemplary embodiment of the present disclosure.
Figure 6:
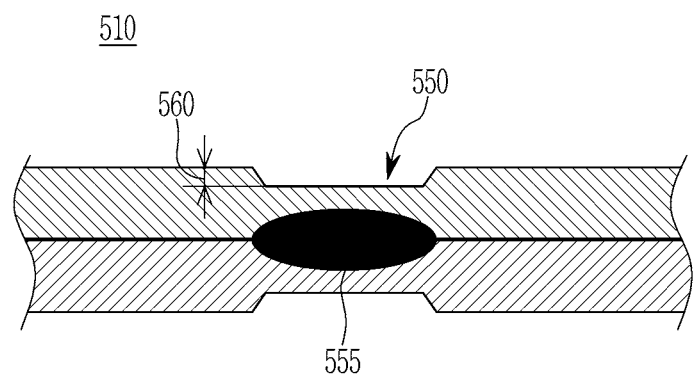
FIG. 6 is a cross-sectional view showing the material shown in FIG. 5.
Figure 7A:
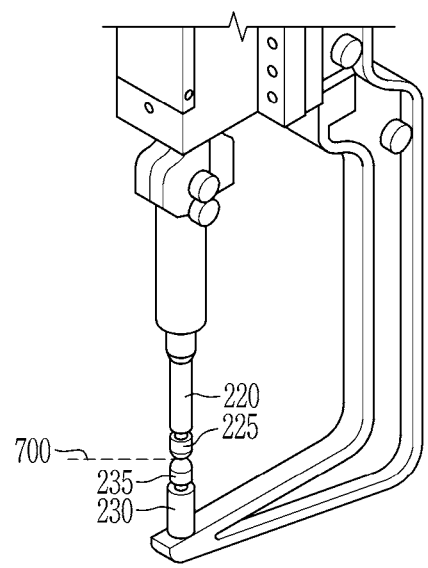
FIGS. 7A and 7B are exemplary views for explaining the position of the welding gun in the welding quality inspection method according to an exemplary embodiment of the present disclosure.
Figure 7B:
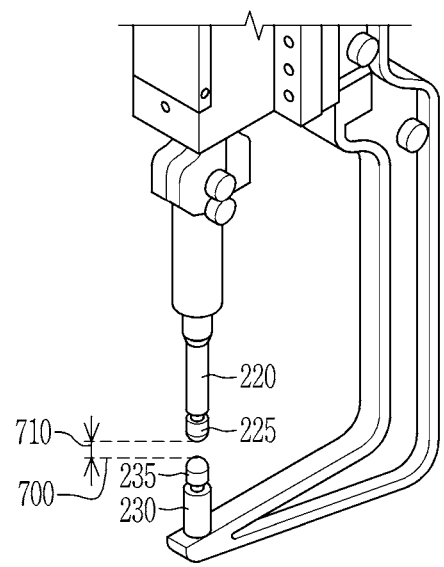
Figure 8:
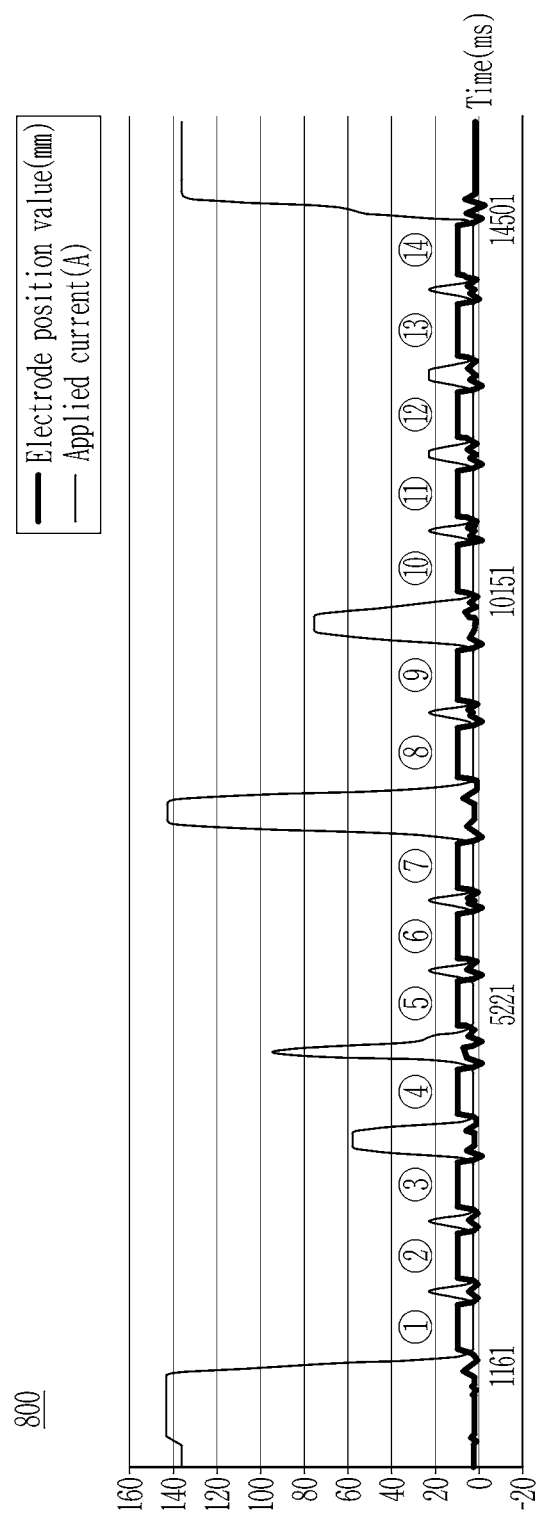
FIG. 8 is an exemplary view showing a position table according to an exemplary embodiment of the present disclosure.
Figure 9:
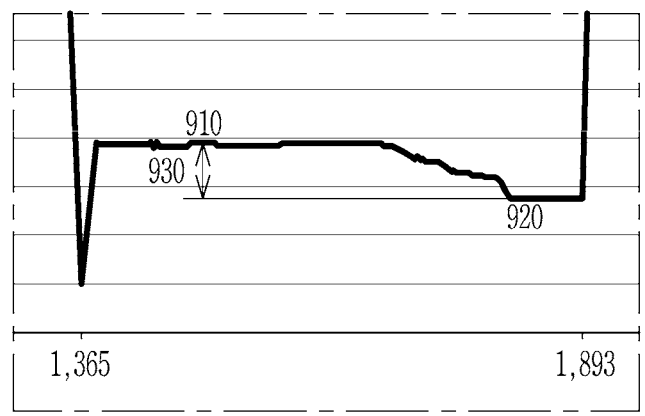
FIG. 9 and FIG. 10 are enlarged views of the position table shown in FIG. 8.
Figure 10:
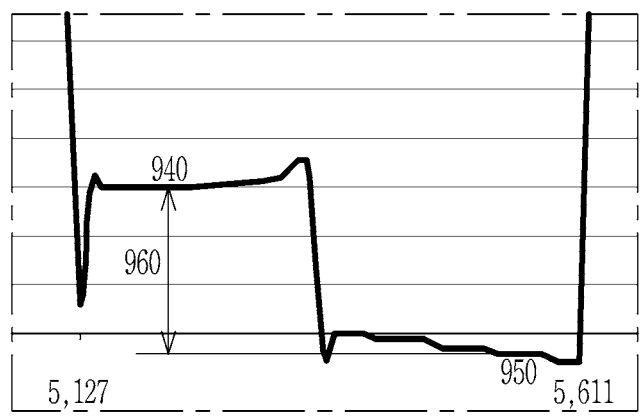
Figure 11:
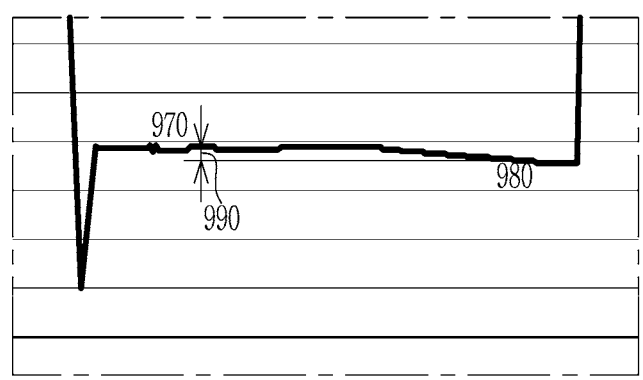
FIG. 11 is an exemplary view for explaining the no welding of the welding quality inspection method according to an exemplary embodiment of the present disclosure.

FIG. 4 is a flowchart showing a welding quality inspection method according to an exemplary embodiment of the present disclosure, FIG. 5 is an exemplary view showing a welding gun for explaining welding in the welding quality inspection method according to an exemplary embodiment of the present disclosure, FIG. 6 is a cross-sectional view showing the material shown in FIG. 5, FIGS. 7A and 7B are exemplary views for explaining the position of the welding gun in the welding quality inspection method according to an exemplary embodiment of the present disclosure, FIG. 8 is an exemplary view showing a position table according to an exemplary embodiment of the present disclosure, FIG. 9 and FIG. 10 are enlarged views of the position table shown in FIG. 8, and FIG. 11 is an exemplary view for explaining the no welding of the welding quality inspection method according to an exemplary embodiment of the present disclosure.

Referring to FIG. 4, the position detection unit 310 detects the position of the upper electrode 220 included in the welding gun 200 during the total welding time for welding the welding portion through the welding gun 200 at S410.

First, as shown in FIG. 5, the welding part of the material 510 is welded through the welding apparatus 100. Specifically, at least two sheets of material 510 to be bonded are overlapped and positioned between the upper electrode 220 and the lower electrode 230 of the welding gun 200. The overlapping material 510 is supported through the lower electrode 230, the upper electrode 220 is lowered through the drive motor 255, and the upper electrode 220 is connected to the material 510. Thereafter, a current is applied to the material 510 through the upper electrode 220 and the lower electrode 230 while the material 510 is pressed by the upper electrode 220. Then, the welding part 550 is heated as shown in FIG. 6 as the electrical resistance. Accordingly, as shown in FIG. 6, a welding nugget 555 is formed by resistance to weld the overlapped material 510. At this time, the overlapping material 510 is generated by depression 560 by melting. Accordingly, the present disclosure allows the quality of the welding to be inspected through a depth change that is recessed during welding.

The position detection unit 310 detects the position of the upper electrode 220 during the total welding time. The position detection unit 310 provides the detected signal to the control unit 320.

The control unit 320 generates a position table based on the signal detected by the position detection unit 310 at S415. Specifically, the control unit 320 receives a signal from the position detection unit 310 and generates the position table based on the received signal. In this case, before starting the welding as shown in FIG. 7A, the control unit 320 may set the initial point 700 where the upper welding tip 225 of the upper electrode 220 and the lower welding tip 235 of the lower electrode 230 meet to zero. As shown in FIG. 7B, the control unit 320 may indicate the distance 710 from the initial point to one end of the upper welding tip 225 as the position of the upper electrode 220. Meanwhile, when the upper welding tip 225 and the lower welding tip 235 are worn out, the position of the upper electrode 220 may be represented as negative.

The control unit 320 generates the position table by matching the position of the upper electrode 220 for each welding time included in the total welding time. For example, the control unit 320 can generate the position table 800 as shown in FIG. 8. Referring to the position table 800 illustrated in FIG. 8, when an electrode position value of the upper electrode 220 is different by 20 mm or more, the upper electrode 220 is moved to weld the next welding part. A total of 14 weldings can be confirmed.

The control unit 320 generates first position data for the first welding time of the spot welding time of each welding part based on the position table at S420.

In other words, the control unit 320 extracts a plurality of electrode position values from the first energization time included in the first welding time to the second energization time based on the position welding table. In this case, the first welding time may represent a time at which welding starts, the first energization time may represent a time starting from the first welding time, and the second energization time may represent a time ending from the first welding time. For example, the first welding time may represent a time from 20% to 30% of the spot welding time.

That is, the control unit 320 may extract a plurality of electrode position values corresponding to 20% to 30% of the spot welding time in the position table.

The control unit 320 generates first position data by calculating an average value for the plurality of electrode position values.

The control unit 320 generates second position data for the second welding time of the spot welding time of each welding part based on the position table at S425. In other words, the control unit 320 extracts a plurality of electrode position values from the third energization time included in the second welding time to the fourth energization time based on the position welding table. In this case, the second welding time may represent a time for completing the welding, the third energizing time may represent a time starting from the second welding time, and the fourth energizing time may represent a time ending from the second welding time. For example, the second welding time may represent a time from 90% to 100% of the spot welding time. That is, the control unit 320 may extract a plurality of electrode position values corresponding to 90% to 100% of the spot welding time in the position table.

The control unit 320 generates second position data by calculating an average value for the plurality of electrode position values.

The control unit 320 generates position change data using the first position data and the second position data at S430. That is, the control unit 320 generates position change data by comparing the first position data with the second position data.

The control unit 320 determines whether the position change data is less than or equal to a predetermined value at S435. At this time, the predetermined value is a value set to confirm that welding is not performed, and may be a preset value.

The control unit 320 determines whether the position change data is within the range of the reference data when it exceeds the predetermined value at S440. In this case, the reference data is data set to determine whether the welding is normal or defective, and may be a preset value. The reference data may be different for each of the plurality of welding parts. The reference data may be set based on at least one of the number, type, and thickness of the material 510 for each welding part.

If the position change data is within the reference data range, the control unit 320 determines to be normal at S445. For example, FIG. 9 is an enlarged view of ① of the position table shown in FIG. 8. As shown in FIG. 9, the first position data 910 is 0.385 mm, the second position data 920 is 0.268 mm, and the position change data 930 is 0.117 mm based on the position table. The control unit 320 may set the reference data for the welding part ① to more than 0.1 and less than 0.2 based on the number, the thickness, and the type of the material 510. The control unit 320 may determine that it is normal because the position change data (0.117 mm) is within the range of the reference data (greater than 0.1 and less than 0.2).

If the position change data is not within the reference data range, the control unit 320 determines that it is defective at S450. For example, FIG. 10 is an enlarged view of ⑤ of the position table shown in FIG. 8. As shown in FIG. 10, the first position data 940 is 0.342 mm, the second position data 950 is 0.026 mm, and the position change data 960 is 0.316 mm based on the position table. The control unit 320 may set the reference data for the welding part ⑤ to more than 0.1 and less than 0.3 based on the number, the thickness, and the type of the material 510. The control unit 320 may determine that it is defective because the position change data (0.316 mm) is not within the range of the reference data (greater than 0.1 and less than 0.3).

If the position change data is less than or equal to the predetermined value, the control unit 320 determines that welding is not performed at S455. For example, as shown in FIG. 11, it may be confirmed that the position change data 990, which is a difference between the first position data 970 and the second position data 980, is 0.027 mm. The control unit 320 may set the predetermined value to 0.05 mm. The control unit 320 may determine that welding is not performed when the position change data (0.027) is less than or equal to the set value (0.05).

The control unit 320 generates the result data based on the determined result at S460. That is, if the position change data is within the range of the reference data, the control unit 320 determines to be normal and generates the result data. And if the position change data is not within the range of the reference data, the control unit 320 determines to be defective and generates the result data. In addition, if the position change data is less than or equal to the predetermined value, the control unit 320 determines that welding is not performed and generates the result data.

The control unit 320 outputs the result data at S465. That is, the control unit 320 may output the result data through the sound, the color of the light, or the screen.

Accordingly, as described above, the welding quality inspection apparatus 300 according to the present disclosure detects the position of the upper electrode 220 during the welding through the position detection unit 310 without adding a separate device. In addition, since it is possible to determine whether it is defective by checking a change in the position of the upper electrode 220 based on the detected signal, it is possible to perform a full inspection and to inspect the welding quality in real time.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A welding quality inspection apparatus for inspecting the welding quality of a plurality of welding parts formed on a material through an upper electrode and a lower electrode of a welding gun, comprising:
    a position detection unit for detecting a position of the upper electrode;
    a control unit generating a position table based on a signal detected by the position detection unit during a total welding time of welding the plurality of welding parts of the material, generating first position data for a first welding time and second position data for a second welding time of a spot welding time of each of the welding parts based on the position table, checking whether the welding parts are defective by using the first position data, the second position data, and reference data, and generating result data based on whether the welding parts are detective; and
    an output unit for outputting the result data;
    wherein the control unit extracts a plurality of electrode position values from a first energization time to a second energization time in the spot welding time from the position table, and generates the first position data using the plurality of electrode position values;

wherein the control unit generates the first position data by calculating an average value of the plurality of electrode position values;

wherein the control unit extracts a plurality of electrode position values from a third energization time to a fourth energization time in the spot welding time from the position table, and generates the second position data using the plurality of electrode position values; and wherein the control unit generates the second position data by calculating an average value of the plurality of electrode position values.

2. The welding quality inspection apparatus of claim 1, wherein:
the control unit compares the first position data with the second position data to generate position change data, and if the position change data is within a reference data range, determines that welding is normal to generate result data.

3. The welding quality inspection apparatus of claim 1, wherein:
the control unit sets the reference data based on at least one of a number, type, and thickness of the material for each of the plurality of welding parts.

4. The welding quality inspection apparatus of claim 1, wherein:
the output unit includes at least one of:
a speaker to output the result data through sound;
a display unit for displaying the result data; and
a lamp unit for outputting the result data through light.

5. A welding quality inspection method for inspecting a welding quality of a plurality of welding parts formed on a material through an upper electrode and a lower electrode of a welding gun, comprising:
detecting a position of the upper electrode during a total welding time of welding the plurality of welding parts of the material;
generating a position table based on the position of the upper electrode;
generating first position data for a first welding time of a spot welding time of each of the welding parts based on the position table;
generating second position data for a second welding time of a spot welding time of each of the welding parts based on the position table; and generating result data by checking whether the welding parts are defective based on the first position data, the second position data, and reference data;

wherein generating the first position data includes:
extracting a plurality of electrode position values from a first energization time to a second energization time included in the first welding time in the spot welding time from the position table; and
generating the first position data by calculating an average value of the plurality of electrode position values; and wherein generating the second position data includes:
extracting a plurality of electrode position values from a third energization time to a fourth energization time included in the second welding time in the spot welding time from the position table; and
generating the second position data by calculating an average value of the plurality of electrode position values.

6. The welding quality inspection method of claim 5, wherein:
generating the result data includes:
generating position change data by comparing the first position data and the second position data;
determining whether the position change data is within the reference data; and
determining that welding is normal and generating result data if the position change data is within a reference data range.

7. The welding quality inspection method of claim 5, further comprising:
before generating the result data,
setting the reference data based on at least one of a number, type, and thickness of the material for each of the plurality of welding parts.

8. The welding quality inspection method of claim 6, wherein:
generating the result data includes:
determining whether the position change data is equal to or less than a predetermined value; and
determining that welding is not performed if the position change data is less than or equal to the predetermined value, and generating the result data.

* * * * *